Patented Sept. 19, 1933

1,927,143

UNITED STATES PATENT OFFICE 1,927,143

PLASTIC COMPOSITION CONTAINING CELLULOSE DERIVATIVES

James F. Walsh, South Orange, Harry E. Smith and Amerigo F. Caprio, Newark, N. J., assignors to Celluloid Corporation, a corporation of New Jersey No Drawing. Application May 12, 1930
Serial No. 451,861

7 Claims. (Cl. 106—37)

This invention relates to plastic compositions containing derivatives of cellulose, and relates more particularly to the use of lower alkyl phthalates as plasticizers or softening agents in such compositions.

An object of our invention is to prepare plastic compositions containing derivatives of cellulose which are cheaper and have superior properties than those heretofore made.

A further object of our invention, is to employ the lower alkyl phthalates as plasticizer for plastic compositions containing a derivative of cellulose. Other objects of our invention will appear from the following detailed description.

The plasticizer most commonly used in plastic compositions containing pyroxylin is camphor. While the use of camphor produces excellent results, it is relatively expensive and has a characteristic odor that is objectionable for certain purposes. We have found that the lower alkyl phthalates, i. e. dimethyl phthalates, diethyl phthalate or methyl ethyl phthalate, may be employed as plasticizers for making cellulose derivative plastics with excellent results.

That the lower alkyl phthalates may be successfully employed as plasticizers in plastic compositions is surprising. It would be assumed that because of their relatively low boiling points (dimethyl phthalate has a B. P. of 282° C. and diethyl phthalate has a B. P. of 290° C.) that these materials would be too volatile to be used successfully, since they would tend to evaporate from the plastic composition. We have found that this is true in the case of the thin coatings produced from lacquers or coating compositions, but we have made the surprising discovery that in the case of relatively thick films employed for phototgraphic film base, or the still thicker articles made from plastic compositions, the lower alkyl phthalates are retained in the plastic composition even after a prolonged exposure to elevated temperatures.

We have found that this surprising result is due to the fact that the cellulose derivatives employed in the plastic composition have a great retentive power or affinity for the lower alkyl phthalates. This retentive power or affinity is sufficient to overcome the tendency to evaporate due to lower boiling point, as shown by the fact that when two films of appreciable thickness containing pyroxylin, one containing diethyle phthalate (B. P. 290° C.) and the other containing dibutyl phthalate (B. P. 335° C.), were exposed to a temperature of 95° C. for a month, the film containing the dibutyl phthalate suffered greater loss in weight than did the film containing the diethyl phthalate, despite the fact that the latter has a lower boiling point.

In accordance with our invention, we prepare plastic compositions containing a derivative of cellulose and an alkyl ester of phthalic acid, where the alkyl radicals contain no more than two carbon atoms, as plasticizer. Other plasticizers may also be added to the plastic composition.

In making the plastic composition any suitable derivative of cellulose such as pyroxylin or cellulose nitrate or an organic derivative of cellulose may be used. Examples of such derivatives of cellulose are cellulose acetate, cellulose formate, cellulose propionate or cellulose butyrate, while examples of cellulose ethers are ethyl cellulose, methyl cellulose or benzyl cellulose.

As stated we employ an alkyl ester of phthalic acid where the alkyl radical contains no more than two carbon atoms as the plasticizer. Such alkyl esters are dimethyl phthalate, diethyl phthalate or methyl ethyl phthalate. These compounds may be represented by the formula

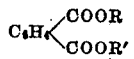

where R and R' may be either ethyl or methyl. Often a mixture of two or more of these alkyl phthalates may be used as plasticizer with excellent results.

In many cases, other plasticizers may also be added to the composition. Examples of these plasticizers are camphor, diethyl tartrate, dibutyl tartrate, triphenyl phosphate, para-ethyl-toluene-sulfonamid, etc. The choice of such plasticizers will depend upon the derivative of cellulose present and the particular use to which the plastic composition may be put. We have found that in the case of a plastic composition containing cellulose acetate and a plasticizer such as triphenyl phosphate or para-ethyl-toluene-sulfonamid, the presence of the lower alkyl phthalates have a tendency to prevent exudation of such other plasticizers. The total amount of plasticizer employed will generally vary from 20 to 60% of the weight of the derivative of cellulose present.

In making the plastic compositions, the cellulose derivatives and plasticizers may be mixed with suitable volatile solvents or latent solvents, such as acetone, ethyl alcohol, methyl alcohol, benzol or suitable mixtures of these. The choice of solvents or solvent mixtures depends upon the solubility characteristics of the particular cellulose derivative employed. The mass may be converted or gelatinized by kneading at elevated temperatures and then treated with heated malaxating rolls and then further worked up into desired form by any known method. Solutions of the cellulose derivative and the plasticizers may be cast on polished surfaces to form photographic films. This invention may be used for making a finely divided mixture of the cellulose derivative and the plasticizer which is adapted to be molded under heat and pressure to form desired articles.

In making the plastic composition, pigments, dyes, fillers or other effect materials may be added as may be also stabilizers, such as urea, etc. By the addition to the plastic composition of relatively small amounts of compatible resins, such as the fusible and soluble phenol-formaldehyde condensation products, a product of superior and more lasting finish is obtained.

Any desired articles such as photographic film base, laminated glass having a sheet of a plastic composition interposed between sheets of glass, toilet articles, coated wire cloth to be used as glass substitute, sheets, rods, tubes, etc., may be made with the plastic composition. Such products have the tensile strength, percentage of elongation, flexibility, resistance to light and heat, and permanence required of cellulosic plastics. Moreover the clear composition of cellulose derivatives and the lower alkyl phthalates have a high transparency for ultra-violet rays, which is of great importance in the case of coated wire cloth to be used as a glass substitute in chicken houses, hot houses and the like.

In order further to illustrate our invention, but without being limited thereto, the following specific examples are given.

Example I

For making a plastic sheet to be used in the preparation of laminated glass or shatterless glass, any one of the following three compositions may be employed.

|  | Parts by weight |
|---|---|
| (a) Pyroxylin | 100 |
| Camphor | 20 |
| Diethyl phthalate | 20 |
| Stabilizer (such as urea) | 0.5 |
| Color | q.s. |
| (b) Pyroxylin | 100 |
| Diethyl phthalate | 35 |
| Urea | 0.5 |
| (c) Cellulose acetate | 100 |
| Triphenyl phosphate | 10 |
| Dimethyl phthalate | 20 |
| Para-ethyl-toluene-sulfonamid | 15 |

Example II

The following compositions may be employed for making articles in general such as toilet sets, etc.

|  | Parts by weight |
|---|---|
| (a) Pyroxylin | 100 |
| Camphor | 10 |
| Diethyl phthalate | 10 |
| Dibutyl phthalate | 10 |
| Urea | 0.5 |
| (b) Pyroxylin | 100 |
| Dibutyl phthalate | 20 |
| Dimethyl phthalate | 10 |
| Camphor | 5 |
| Urea | 0.5 |
| (c) Cellulose acetate | 100 |
| Triphenyl phosphate | 15 |
| Mixed ortho and paraethyl toluene sulphonamids | 15 |
| Dimethyl phthalate | 20 |
| (d) Cellulose acetate | 100 |
| Mixed aromatic phosphates | 15 |
| Para-ethyl-toluol sulfonamid | 27½ |
| Dimethyl phthalate | 2½ |

Example III

The following compositions may be employed for making photographic film base.

|  | Parts by weight |
|---|---|
| (a) Pyroxylin | 100 |
| Diethyl phthalate | 10 |
| Camphor | 10 |
| (b) Cellulose acetate | 100 |
| Triphenyl phosphate | 20 |
| Diethyl phthalate | 10 |

In all of the above examples, only the non-volatile constituents have been given. Of course in the preparation of plastic compositions, suitable amounts of volatile solvents are employed to form solutions or plastic masses which are then worked up by known methods into the desired articles.

It is to be understood that the foregoing examples are given merely by way of illustration, and that many variations may be made therein without departing from the spirit of our invention.

Having described our invention, what we desire to secure by Letters Patent is:

1. An article of substantial thickness formed from a molded plastic composition containing a derivative of cellulose and a plasticizer comprising an alkyl ester of phthalic acid where the alkyl radicals contain no more than two carbon atoms and another plasticizer which tends to exude, the amount of alkyl ester of phthalic acid present being sufficient to prevent exudation of the other plasticizer.

2. An article of appreciable thickness formed from a molded plastic composition containing cellulose nitrate and a plasticizer comprising an alkyl ester of phthalic acid where the alkyl radicals contain no more than two carbon atoms and another plasticizer which tends to exude, the amount of alkyl ester of phthalic acid present being sufficient to prevent exudation of the other plasticizer.

3. An article of appreciable thickness formed from a molded plastic composition containing a derivative of cellulose and a plasticizer comprising diethyl phthalate and another plasticizer which tends to exude, the amount of diethyl phthalate present being sufficient to prevent exudation of the other plasticizer.

4. An article of appreciable thickness formed from a molded plastic composition containing a derivative of cellulose and a plasticizer comprising dimethyl phthalate and another plasticizer which tends to exude, the amount of dimethyl phthalate present being sufficient to prevent exudation of the other plasticizer.

5. An article of substantial thickness formed from a molded plastic composition containing cellulose acetate and a plasticizer comprising an alkyl ester of phthalic acid where the alkyl radicals contain no more than two carbon atoms and another plasticizer which tends to exude, the amount of alkyl ester of phthalic acid present being sufficient to prevent exudation of the other plasticizer.

6. An article of appreciable thickness formed from a molded plastic composition containing cellulose acetate and a plasticizer comprising diethyl phthalate and another plasticizer which tends to exude, the amount of diethyl phthalate present being sufficient to prevent exudation of the other plasticizer.

7. An article of appreciable thickness formed from a molded plastic composition containing cellulose acetate and a plasticizer comprising dimethyl phthalate and another plasticizer which tends to exude, the amount of dimethyl phthalate present being sufficient to prevent exudation of the other plasticizer.

JAMES F. WALSH.
HARRY E. SMITH.
AMERIGO F. CAPRIO.